No. 765,114. PATENTED JULY 12, 1904.
L. E. WATERMAN.
SEEDING MACHINE.
APPLICATION FILED JUNE 22, 1904.
NO MODEL. 2 SHEETS—SHEET 2.

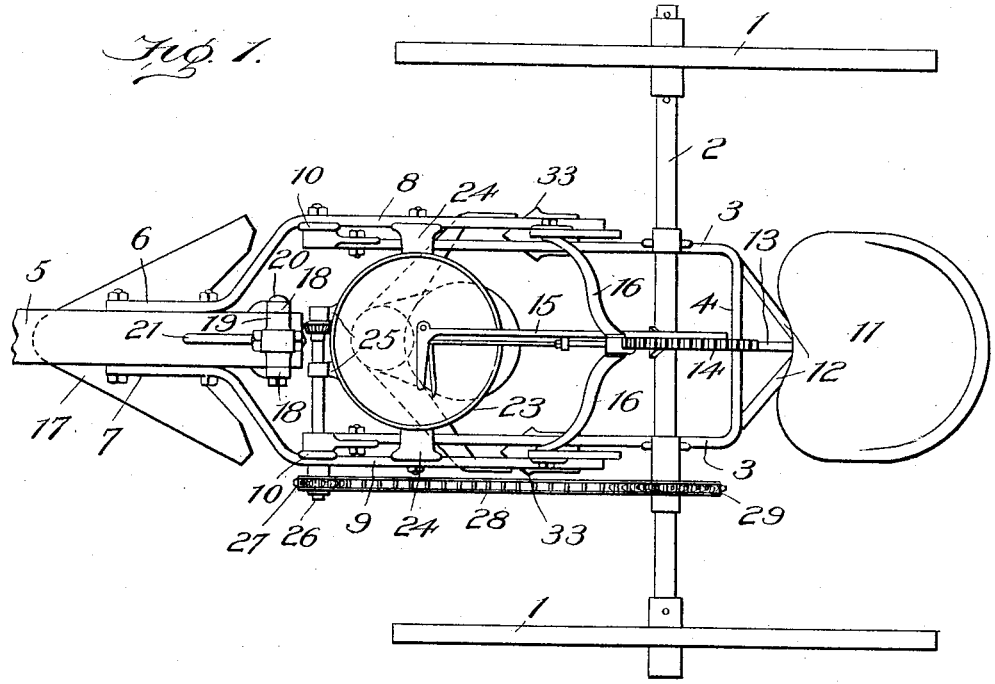
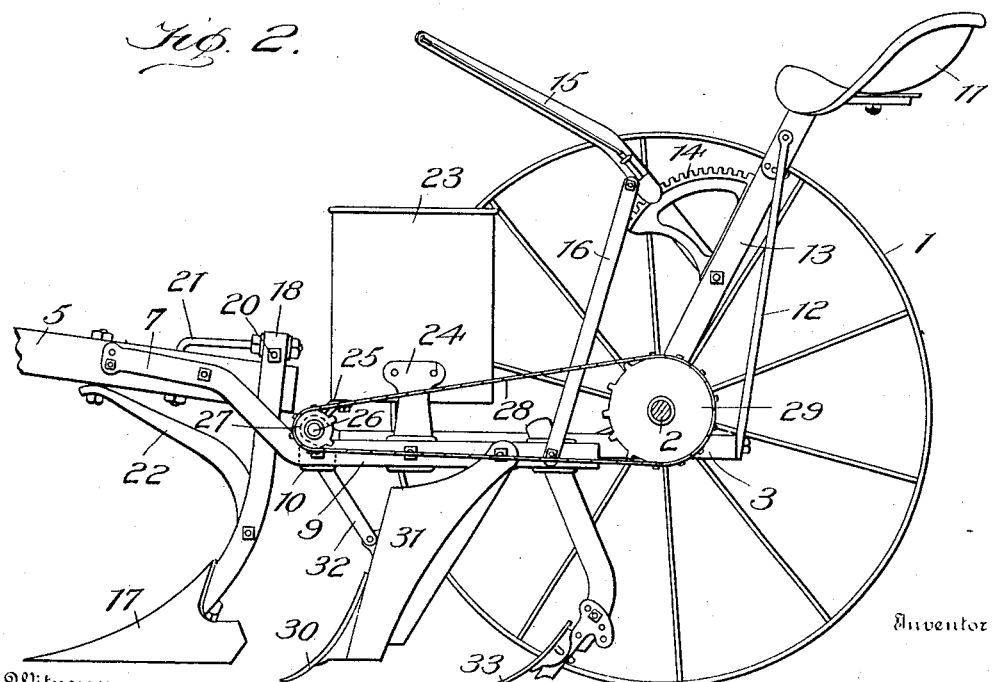

Witnesses
Edwin L. Bradford
P. H. Burch

Inventor
Lewis E. Waterman
By A. O. Behel
Attorney

No. 765,114. Patented July 12, 1904.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

SEEDING-MACHINE.

SPECIFICATION forming part of Letters Patent No. 765,114, dated July 12, 1904.

Application filed June 22, 1904. Serial No. 213,619. (No model.)

*To all whom it may concern:*

Be it known that I, LEWIS E. WATERMAN, a citizen of the United States, residing at Rockford, in the county of Winnebago and State of Illinois, have invented certain new and useful Improvements in Seeding-Machines, of which the following is a specification.

This invention relates to improvements in seeding-machines, employed principally in planting cotton, of the same general type as shown and described in my copending application, filed January 22, 1903, Serial No. 140,185, in which a bed is previously thrown up and the seeding-machine in passing over the bed removes the top hardened surface, with its weeds, opens up a furrow, deposits the seed in the furrow, and finally covers the seed.

Figure 3:
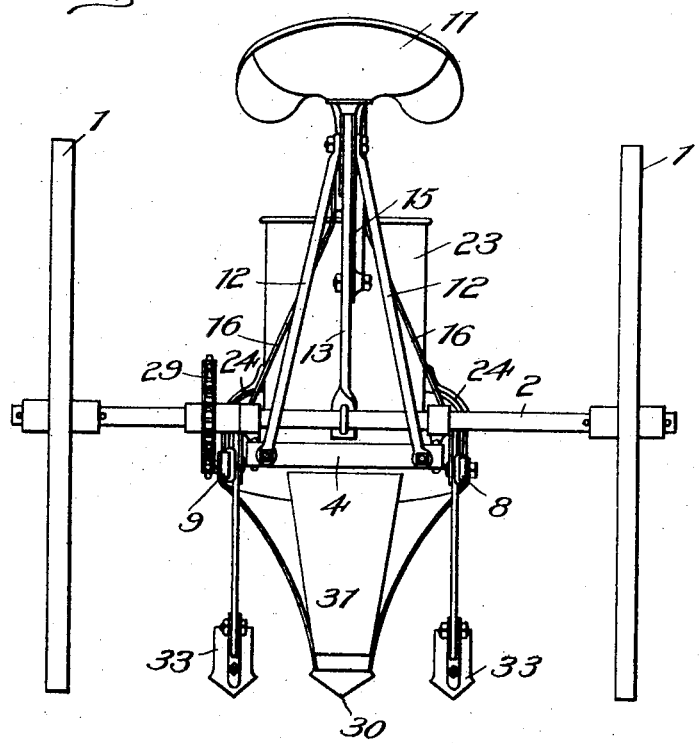
Figure 4:
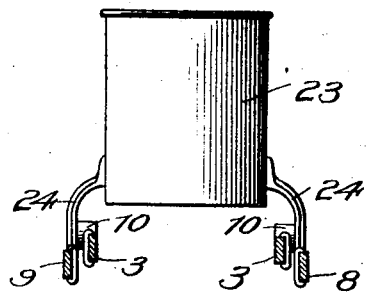

In the accompanying drawings, Figure 1 is a plan view of my improved seeding-machine. Fig. 2 is a side elevation. Fig. 3 is a rear elevation. Fig. 4 is a transverse section of the frames, showing the support for the seedbox.

The wheels 1 support an axle 2.

The main frame is composed of the side bars 3 and end bar 4. The side bars have a connection with the axle and extend forward therefrom. A tongue 5 has two bars 6 and 7 secured to the sides thereof and are curved outward and extend rearward parallel with the side bars 3 of the main frame, forming the sections 8 and 9. A pivotal connection is formed between the forward ends of the side bars of the main frame and the rearwardly-extending sections 8 and 9 by the brackets 10.

A seat 11 is supported by braces 12, connected to the end bar 4 of the main frame, and a center support 13, connected to the axle. A toothed quadrant 14 is supported by the center support 13. A hand-lever 15 has a pivotal connection with the support 13 and is provided with the usual dog and thumb-lever arrangement for engaging the toothed quadrant. Two links 16 have a pivotal connection at one end with the hand-lever and at their other ends with the rearwardly-extending sections 8 and 9.

The tongue 5 supports a sweep 17 by the branches of the sweep-stock 18, extending upwardly outside of the tongue and having their upper ends connected by a cross 19, through which a bolt 20 passes. A rod 21 has one end connected to the tongue and its other end passing through the cross-receiving nuts on each side of the cross. A brace 22 has one end connected to the under side of the tongue and its other end pivotally connected to the sweep-stock, thereby holding the sweep in proper working position.

A seedbox 23 is located centrally between the side bars 3 of the main frame and is supported by brackets 24, secured to the seedbox and to the rearwardly-extending sections 8 and 9. From the forward face of the seedbox 23 extends two supports 25 and located in line with the pivotal connection between the main frame and the rearwardly-extending sections 8 and 9. A shaft 26 is supported by the supports 25 and one of the brackets 10 and has a gear connection with the seed-dropping mechanism of the seedbox. This shaft extends beyond the side of the rearwardly-extending section 9 and supports a sprocket-wheel 27. A chain 28 connects this sprocket-wheel 27 with a sprocket-wheel 29, secured to the axle 2.

A furrow-opener 30 is supported by a seed-discharge tube 31, connected to the rearwardly-extending sections 8 and 9. This tube has a brace 32 connecting it with one of the supports 25.

Covering-shovels 33 have a connection with the rearwardly-extending sections 8 and 9 and are located in rear of the lower end of the seed-discharge tube 31.

The sweep, furrow-opener, seedbox, and covering-shovels are supported to be moved together by means of the lifting-lever and can be held elevated or forced into the ground. The sweep will remove the hardened top of the bed, also the weeds. The furrow-opener will form a trench in the soft ground, seed will be deposited through the tube into the trench, and the shovels will cover the seeds.

The rearwardly-extending branches 8 and 9 in their connection with the tongue may be termed a "tongue-supporting frame."

I claim as my invention—

1. In a seeding-machine, a main frame supported on carrying-wheels, a tongue-frame having a connection with the main frame, the side bars of the tongue-frame lying outside the side bars of the main frame, a seedbox disposed within the main frame, brackets carried by the tongue-frame and supporting said seedbox, a furrow-opener, covering devices and a sweep supported from the tongue-frame, and means for raising and lowering the latter-named frame relatively to the main frame.

2. In a seeding-machine, an axle supported on carrying-wheels, a main frame, a tongue-frame having a connection with the main frame and located without the same, a seedbox, furrow-opener, covering devices and a sweep carried by the tongue-frame, and means for raising and lowering said latter-named frame.

3. In a seeding-machine, a main frame supported on carrying-wheels, a tongue-frame pivoted to the main frame, the side bars of the tongue-frame lying outside the side bars of the main frame, a seedbox, furrow-opener, covering devices and a sweep supported from the tongue-frame, and means for raising and lowering the latter-named frame relatively to the main frame.

4. In a seeding-machine, a main frame supported on carrying-wheels, a tongue-frame having a pivotal connection with the main frame, the side bars of the tongue-frame lying outside the side bars of the main frame, a bracket secured to each side bar of the tongue-frame, said brackets overhanging the side bars of the main frame, a seedbox mounted upon said brackets, a furrow-opener, covering-shovels and a sweep supported from the tongue-frame, and means for raising and lowering the rear end of the latter-named frame relatively to the main frame.

5. In a seeding-machine, a main frame supported on carrying-wheels, a tongue-frame having a pivotal connection with the main frame, the side bars of the tongue-frame lying outside the side bars of the main frame and terminating at a point forward of the wheel-axle, a seedbox, furrow-opener, covering devices and a sweep supported from the tongue-frame, an operating-lever for raising and lowering the rear end of the tongue-frame, and links connecting said latter-named frame with the operating-lever.

In testimony whereof I have hereunto set my hand in presence of two subscribing witnesses.

LEWIS E. WATERMAN.

Witnesses:
G. E. HENRY,
A. O. BEHEL.